United States Patent [19]

Kimura et al.

[11] Patent Number: 4,708,696
[45] Date of Patent: Nov. 24, 1987

[54] TENSIONER FOR TOOTHED DRIVE BELTS

[75] Inventors: Kazuo Kimura, Tokorozawa; Masao Maruyama, Hanno, both of Japan

[73] Assignee: Tsubakimoto Chain Co., Osaka, Japan

[21] Appl. No.: 872,928

[22] Filed: Jun. 11, 1986

[30] Foreign Application Priority Data

Aug. 30, 1985 [JP] Japan .......................... 60-131595[U]
Aug. 30, 1985 [JP] Japan .......................... 60-131591[U]
Aug. 30, 1985 [JP] Japan .......................... 60-131592[U]
Aug. 30, 1985 [JP] Japan .......................... 60-131593[U]
Aug. 30, 1985 [JP] Japan .......................... 60-131594[U]

[51] Int. Cl.⁴ .............................................. F16H 7/12
[52] U.S. Cl. .................................... 474/103; 474/138
[58] Field of Search ............................... 474/101-103, 474/109-111, 136, 138, 133, 135; 305/10; 267/34

[56] References Cited

U.S. PATENT DOCUMENTS

| | | | |
|---|---|---|---|
| 3,574,418 | 4/1971 | Okabe | 474/110 X |
| 3,595,551 | 7/1971 | Ortheil | 267/34 X |
| 3,666,256 | 5/1972 | Ellis et al. | 267/34 |
| 3,794,309 | 2/1974 | Chrokey et al. | 267/34 |
| 4,411,638 | 10/1983 | Wilson | 474/110 X |
| 4,472,161 | 9/1984 | Ojima | 474/138 X |
| 4,539,001 | 9/1985 | Okabe | 474/138 |

FOREIGN PATENT DOCUMENTS

| | | | |
|---|---|---|---|
| 0512036 | 10/1952 | Belgium | 474/135 |
| 0053954 | 6/1982 | European Pat. Off. | 474/135 |
| 59-6650 | 1/1984 | Japan . | |
| 0208251 | 11/1984 | Japan | 474/135 |
| 0279415 | 11/1951 | Switzerland | 474/135 |

Primary Examiner—Stephen J. Novosad
Assistant Examiner—Thuy M. Bui
Attorney, Agent, or Firm—Howson and Howson

[57] ABSTRACT

A tensioner for toothed belts comprises a hydraulic fluid filled cylinder having a piston with a rod projecting out of the cylinder and engaging a pivoted arm with a roller at one end for engaging the belt. A spring within the cylinder urges the rod in the projecting direction, and a check valve carried by the piston allows the rod to project rapidly to take up slack in the belt. Hydraulic fluid, however, flows through the small clearance between the piston and the cylinder wall as the rod retracts, and therefore limits the rate of retraction. A path is provided between seals surrounding the rod to route air directly to the reservoir so that it does not enter the fluid chambers within the cylinder. The piston material is chosen to expand more rapidly than the cylinder with increasing temperatures to reduce variations in leakdown time.

21 Claims, 10 Drawing Figures

TENSIONER FOR TOOTHED DRIVE BELTS

BRIEF SUMMARY OF THE INVENTION

This invention relates to tensioners for toothed belts and in particular to tensioners for flexible toothed belts of the kind used, for example, to drive the camshafts of internal combustion engines.

In many applications of toothed drive belts, it is essential to prevent the belt from jumping over teeth of the driving or driven wheel. Prevention of such jumping is important in the case of a belt-driven camshaft in an internal combustion engine because jumping of teeth will throw the camshaft timing off by several degrees, possibly rendering the engine completely inoperative. In the environment of an internal combustion engine, belt tension can vary to excessively high or low levels due to wide variations in temperature and differences between the coefficients of linear expansion of the belt material and of the other parts of the engine. Under some conditions, therefore, vibrations, bumps in the road, and the like can cause tooth jumping. Reverse rotation of an engine, occurring for example in stopping, or in failed attempts at starting, can also cause tooth jumping if belt tension is not properly controlled.

One approach to the problem of controlling tension of a toothed belt is described in Japanese laid-open Utility Model 59-6650. The utility model shows a tensioner comprising a lever arm pivoted at one end and having a roller at its opposite end bearing against the smooth side of a toothed belt. The force urging the roller against the belt is applied by a cylinder unit connected at one end to an intermediate point on the lever arm and fixed at its opposite end. The cylinder unit has front and rear chambers separated by an intermediate partition having two check valves arranged to allow flow in opposite directions. The rear chamber is expansible by means of a spring-loaded rear piston, and the front chamber includes a spring-loaded front piston from which the connection is made to the intermediate point on the lever arm. Increases in belt tension are accommodated by retraction of the front piston, and decreases in belt tension are likewise accommodated by extension of the front piston. Experience with this device, however has shown that the retraction of the front piston may be stepwise or non-continuous under some conditions and adjustment of belt tension may not be smooth. Furthermore, the construction of this device is complicated due to the arrangement of pistons in front and rear chambers, the division of the cylinder into two chambers by the intermediate partition, and the need for installation of two check valves in the intermediate partition.

The more important objects of the present invention are to provide a tensioner for toothed belts which is:

(1) simple in construction;

(2) capable of accommodating variations in belt tension smoothly;

(3) able to prevent tooth jumping under even the most adverse conditions such as reverse rotation of an engine;

(4) unaffected in its operation by oil leakage or entry of air;

(5) capable of operating reliably over long periods of time;

(6) unaffected in its operation by variations in ambient temperature;

(7) readily collapsed to allow installation and replacement of the belt; and (8) capable of accommodating variations in belt tension by the action of a hydraulically damped spring with minimal leakage of hydraulic fluid and with minimal leakage of air into the fluid chambers.

The tensioner in accordance with the present invention achieves the above objects as well as various other objects which will be apparent from the detailed description.

The tensioner of the invention comprises a cylinder having a cylindrical interior wall, a piston slidable within, and substantially conforming to, the cylindrical wall, a rod connected to the piston and extending substantially along the axis of the interior wall from the piston to the exterior of the cylinder, and packing surrounding the rod. With the cylinder and piston, the packing forms an enclosed first chamber on one side of the piston. An enclosed second chamber is provided on the opposite side of the piston. Hydraulic fluid fills both chambers. A first fluid passage having a one-way check valve allows flow of hydraulic fluid from one of the chambers to the other as the piston moves in a first direction to decrease the volume of said one of the chambers. The first fluid passage is preferably through the piston, and the check valve is preferably carried by the piston. A spring urges the piston in this first direction. A second fluid passage allowing relatively restricted flow of hydraulic fluid from said other chamber to said one of said chambers as the piston moves in the opposite direction.

The second fluid passage is preferably provided by a small clearance between the piston and the cylindrical interior wall.

In a preferred form of the invention, the first fluid passage comprises a first part extending axially through the piston and a second part, communicating with the first part, said second part extending transversely through the rod. The spring is preferably a compressed coil spring located in the second chamber and bearing against the piston to urge the piston in a direction to decrease the volume of the first chamber.

In one version of the tensioner, a closed-cell foamed elastomer, located within the first chamber, compresses to allow the volumetric expansion of the hydraulic fluid space in the first chamber to equal the volumetric contraction of the hydraulic fluid space in the second chamber as the piston moves in the direction to decrease the volume of the second chamber. The closed-cell foamed elastomer surrounds the rod and closes the space between the rod and the inner wall of the cylinder. It serves in part as a seal to aid in preventing leakage of hydraulic fluid out of the first chamber.

The tensioner also, preferably includes an arm, swingable about a pivot axis, and a roller rotatably mounted on the arm on an axis parallel to, and spaced from the pivot axis. The roller is adapted to engage the smooth side of a toothed belt. The end of the rod remote from the piston is engaged with the arm, and positioned in relation to the arm so that, as the rod extends, it causes the arm to swing about the pivot axis.

In a preferred form of the tensioner a hydraulic fluid reservoir is in communication with the first chamber. A part of the exterior wall of the cylinder may constitute a part of the boundary of the reservoir. A third fluid passage through said part of the exterior wall provides fluid communication between the reservoir and the first chamber. If the packing means comprises first and second packing elements axially spaced from each other, a fourth fluid passage can extend through said part of the exterior wall from the space between the packing element to the reservoir. The reservoir is located above the rod, and the fourth fluid passage extends upwardly from the space between the packing elements to the reservoir so that air, drawn in along the surface of the rod toward the first chamber, is carried upwardly into the reservoir and thereby prevented from entering the first chamber.

Alternatively, the hydraulic fluid reservoir can be separate from the cylindrical wall providing means and connected to the first chamber through an elongated conduit.

In the case in which the second fluid passage allowing relatively restricted flow of hydraulic fluid from said other chamber to said one of said chambers is provided by a clearance between the piston and the cylindrical interior wall, the piston preferably has a higher coefficient of linear expansion than that of the interior wall of the cylinder, and the clearance between the piston and the interior wall is preferably within the range of approximately 0.015 to 0.060 mm. at a temperature of 20° C. This compensates for changes in viscosity of the hydraulic fluid with changes in temperature, and therefore reduces variations in rate of retraction of the piston with changes in temperature. Preferably, the interior wall of the cylinder is cast iron, and the piston is bronze.

The invention provides several alternative ways to retract the piston rapidly to allow for installation or replacement of the toothed belt. In each case, a third fluid passage connects the first and second chambers. The third passage has normally closed valve means for selectably permitting or closing off flow of hydraulic fluid through the third passage. The third passage and valve means allow relatively unrestricted fluid communication between the chambers when the closable valve means is opened. The third fluid passage can be formed in the cylinder wall, connected to the second chamber directly, and connected indirectly to the first chamber through the hydraulic fluid reservoir. Alternatively, the third hydraulic fluid passage can be connected to the first chamber and arranged to terminate at an opening in the interior wall. In this case, the length of the piston and the position of the opening are such that the opening is normally closed by the piston throughout the range of axial movement of the piston. The piston has a recess in its outer surface normally spaced circumferentially from the opening of the third passage, but movable into registration with the opening by rotation of the piston. The recess permits relatively unrestricted flow of hydraulic fluid from the second chamber to the opening, and from the opening through the third passage to the first chamber, so that the piston can be rapidly moved axially during installation or replacement of the belt. Preferably, the rod is fixed against rotation relative to the piston, and includes connection means, at its end remote from the piston, for connection to the arm of a tension roller assembly. The connection means, when connected to an arm, prevents rotation of the rod and piston, and holds the piston in a position to close off the opening of the third passage.

Another preferred form of the invention includes a compressible, sealed, air-filled accumulator in contact with the hydraulic fluid in the first chamber, the compression of the accumulator allowing the volumetric expansion of the hydraulic fluid space in the first chamber to equal the volumetric contraction of the hydraulic fluid space in the second chamber as the piston moves in the direction to decrease the volume of the second chamber. The accumulator is preferably contained in a hollow interior space within the piston, and the hollow interior space is in fluid communication with the first chamber through an opening in the piston. Preferably, the check valve is carried by the piston, the first fluid passage extends through the piston, and the hollow interior space containing the accumulator is part of the first fluid passage.

DETAILED DESCRIPTION

Figure 1:
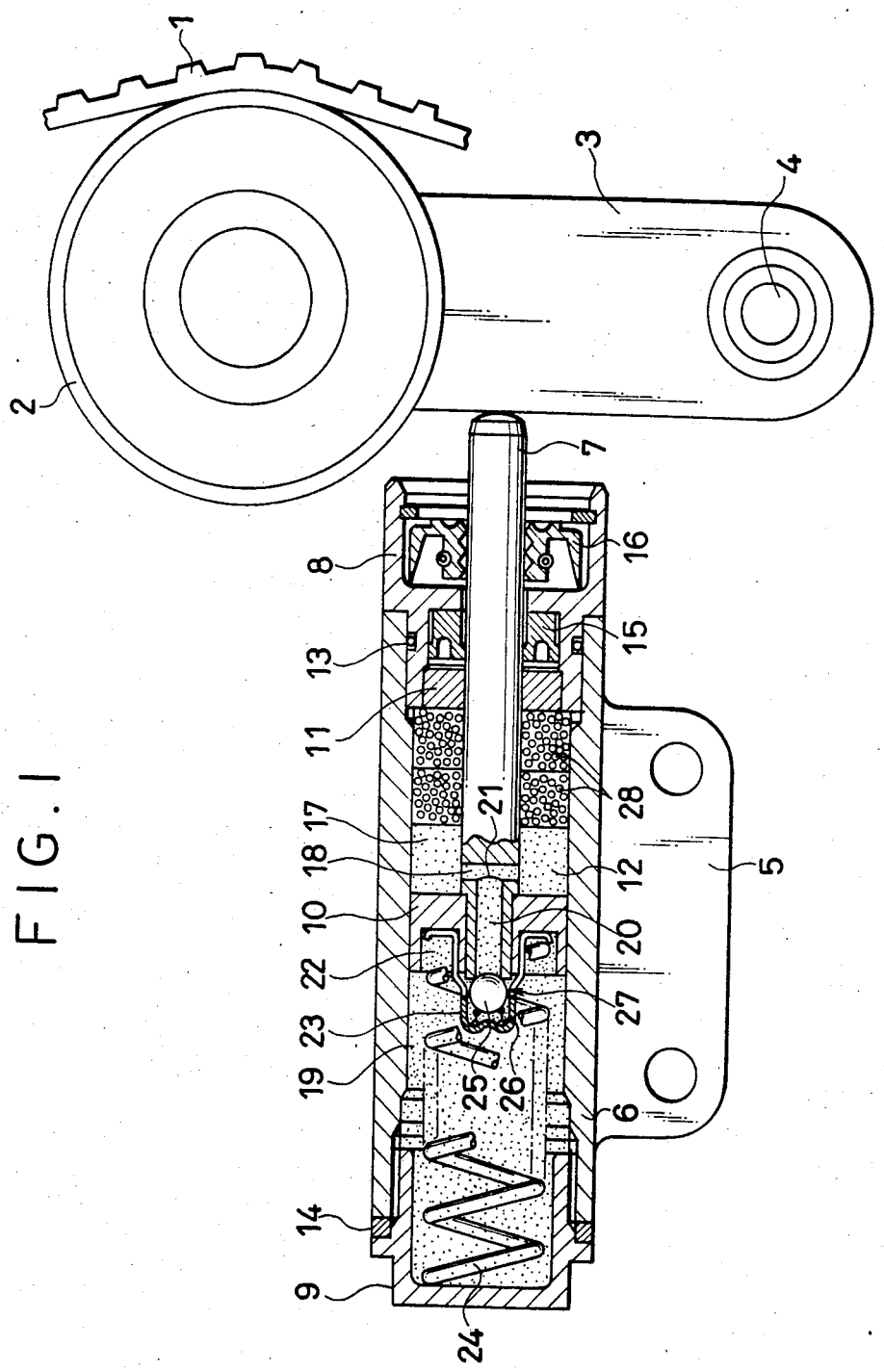
FIG. 1 shows a first embodiment of the invention comprising a cylinder unit shown in longitudinal section, a pivoted arm, and a roller in contact with a toothed belt.

FIG. 1 shows a portion of a typical toothed belt of synthetic rubber or the like. This belt has teeth molded on one face for engagement with the teeth of drive and driven wheels (not shown). The opposite face of the belt is engaged by a roller 2 rotatable in a bearing on the end of an arm 3 pivoted on a pivot 4. As is ordinarily the case in a belt drive, the tensioner roller engages the return run of the belt, i.e. that portion of the belt which moves from the driving wheel toward the driven wheel.

A cylinder 6, mounted in fixed relation to pivot 4 by means of a mounting plate 5, has a piston rod 7 extending outwardly from one end of the cylinder, and engaging arm 3 at a location between pivot 4 and the bearing of roller 2. Engagement takes place in a direction perpendicular to a plane in which the pivot and roller axes lie, so that extension of rod 7 results in clockwise movement of the arm about its pivot 4 and presses the roller against the belt, increasing tension in the belt.

Cylinder 6 is closed by end assemblies 8 and 9, and has a cylindrical inner wall in which piston 10 slides. Piston 10 conforms in shape to the cylindrical inner wall, and a small clearance is provided between the piston and the wall to allow for slow leakage of hydraulic fluid past the piston as the piston moves in a direction to extend rod 7 and tighten the belt.

Rod 7 slides through a guide 11 mounted in end assembly 8. A sealing ring 13 is provided between end assembly 8 and cylinder 6. A gasket 14 is provided between end assembly 9 and the end of the cylinder. Rod 7 extends through an oil seal 15, and a dust seal 16, both provided in end assembly 8.

Piston 10 divides the interior of the cylinder into two hydraulic fluid chambers 17 and 19, both of which are filled with a viscous hydraulic fluid such as an oil. Hydraulic fluid in chamber 17 is in communication with an internal passage 20 in the rod through transverse passage 18 and opening 21. Recess 22 in the piston receives a retainer 23 which holds a check valve ball 25 in a position to seat against an opening in the end of rod 7. This check valve ball is held against the opening by a relatively weak spring 26 positioned between the retainer and the ball so that the opening in passage 20 is normally closed. The retainer, ball and spring constitute a check valve assembly 27, which is operative to permit flow of hydraulic fluid from chamber 17 into chamber 19 as the piston moves in a direction to extend rod 7 out of the cylinder, and to prevent flow back through passage 20 when the piston moves in the opposite direction. A coil spring 24 is located in chamber 19, and is in compression between the end wall of end assembly 9 and the piston. The end of the spring is received in recess 22 of the piston, and holds retainer 23 in place. Closed-cell elastomeric foam rings 28 surround rod 7, and are positioned against guide 11. Elements 28 can be of sponge rubber or similar closed-cell foam material. They are compressible. As the piston moves in a direction to retract rod 7, hydraulic fluid flows between the piston and the cylinder wall from chamber 19 to chamber 17. Because part of the space within chamber 17 is occupied by rod 7, whereas chamber 19 has no similar rod, as the piston moves toward the left, hydraulic fluid flows into chamber 17 at a rate greater than the rate of expansion of the chamber. When this occurs, foam elastomeric elements 28 compress to allow hydraulic fluid to flow into the chamber. When the piston moves in the opposite direction, elements 28 expand. Expansion of these elements as the piston moves toward the left reduces the likelihood that air will be drawn into hydraulic fluid chamber 17 as rod 7 retracts. The foam elastomer elements also aid seal 15 in preventing the leakage of hydraulic fluid from the cylinder.

Spring 24 applies a tension force to toothed belt 1 through roller 2. When belt 1 is stretched, or when the surrounding temperature is decreased, causing the belt tension force to decrease, rod 7 moves forward under the action of the spring 24 to cause the belt tension force to recover to its original value. In this case, hydraulic pressure in chamber 12 increases as the rod advances causing check valve 27 to open. This allows rod 7 to advance rapidly to produce rapid recovery from the reduction in belt tension force.

Where the toothed belt is used to drive a camshaft of an engine, if the engine is rotated in a reverse direction (through less than one rotation) due, for example, to a failed attempt at starting, the tension in the return run of belt 1 is sharply increased for a short period of time. A large force may be imparted to rod 7 urging it in the retracting direction. However, since check valve 27 is closed, rod 7 cannot retract rapidly. Hydraulic fluid will flow through the small clearance around the piston, and rod 7 will gradually retract and settle at a position corresponding to a balanced condition between the force exerted on the rod as a result of belt tension and the force of the spring 24. Therefore, in case of reverse rotation of an engine for a short period of time, roller 2 will not retract excessively and no jump of the toothed belt over the teeth of the wheels will occur as a result of the momentary loosened condition of the belt. By keeping changes in belt tension gradual, the tensioner also increases belt life.

Figure 2:
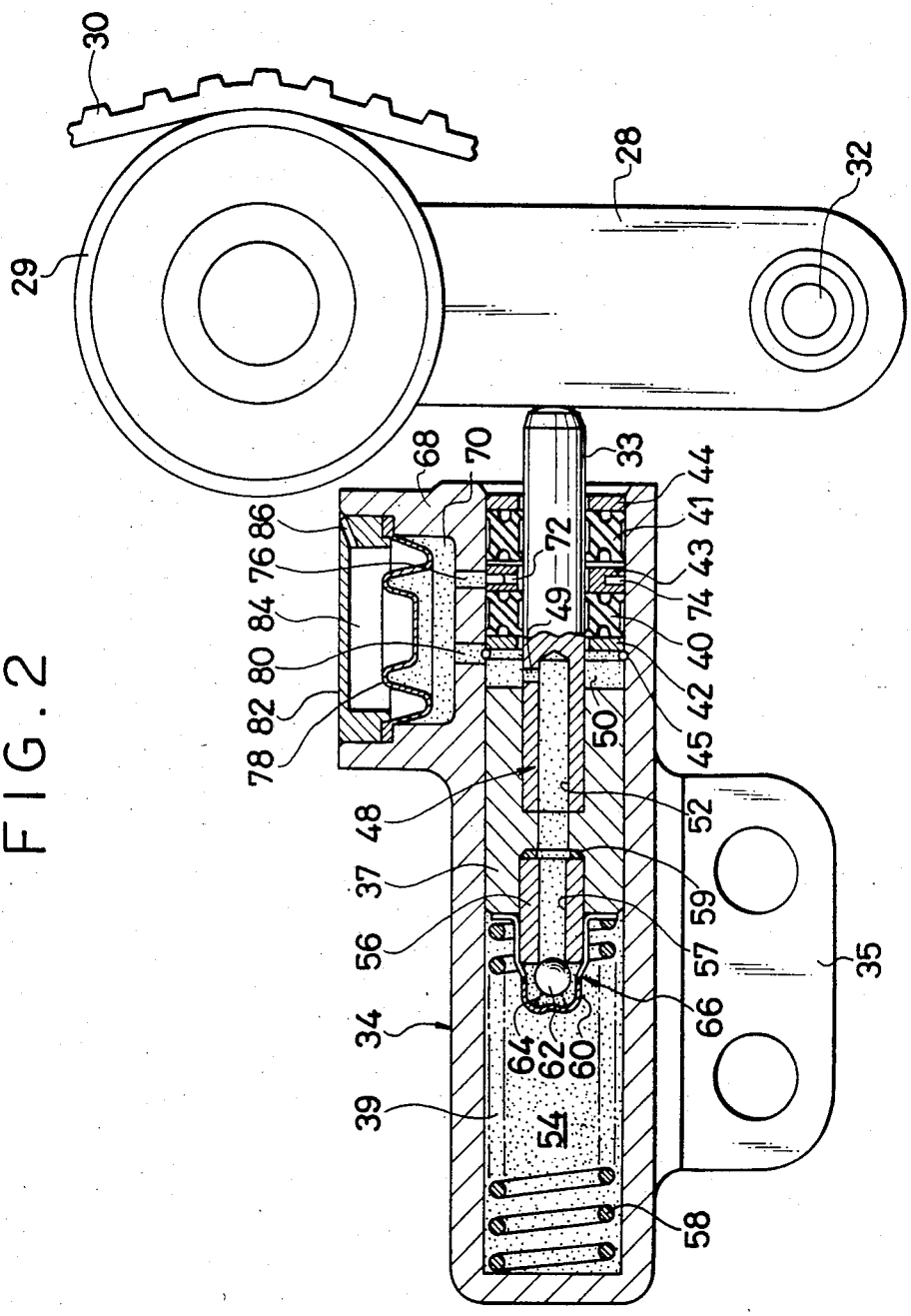
FIG. 2 is a similar view, showing a second embodiment of invention, including a built-in hydraulic fluid reservoir.

FIG. 2 shows a further improved version of the tensioner in which the likelihood of hydraulic fluid leakage is reduced, thereby improving the operating life of the tensioner. The tensioner of FIG. 2 also has improved means for preventing the entry of air into the hydraulic fluid as the piston reciprocates. If air enters the chamber on the side of the piston opposite the rod, compression of the air in that chamber can destroy the damping action of the piston, allowing the rod to retract rapidly, and permitting tooth jumping in the case of sudden increases in belt tension.

In FIG. 2, an arm 28, supporting a roller 29 in contact with the smooth face of a toothed belt 30, is pivotally supported on a fixed pivot 32. Arm 28 is engaged by a rod 33 extending out of cylinder 34. The cylinder is secured in fixed relationship to pivot 32 by means of mounting plate 35, and rod 33 engages the arm in a direction such that extension of the rod presses the roller against the belt to increase belt tension. A piston 37 is slidable in cylinder 34, there being a small clearance between the piston and the inner wall of the cylinder. Rod 33 is press fit into the piston.

To prevent leakage of hydraulic fluid 39, which fills the cylinder 34, X-type packings 40 and 41 and packing glands 42, 43 and 44 are provided.

A ring 45 acts as a stop when piston 37 reaches the rightmost limit of its travel.

Rod 33 has an internal fluid passage 48 composed of a lateral hole 49 opening into chamber 50 to the right of the piston, and a longitudinal hole 52 in communication with the lateral hole and leading to the chamber 54 on the opposite side of the piston. A valve seat 56 is fitted in the left end of the piston 37, and a filler material is provided at 59. The valve seat 56 is provided with a longitudinal hole 57 communicating with longitudinal hole 52. A compression spring 58 is positioned between a check valve retainer 60 and an end surface of the cylinder. Ball 62 held at the center part of retainer 60 is pressed against the opening of longitudinal hole 57 by a weak spring 64. Seat 56, ball 62, retainer 60 and spring 64 constitute a check valve 66 which allows flow of hydraulic fluid 39 from chamber 50 on one side of the piston toward chamber 54 on the opposite side.

A wall 68, projecting upwardly from cylinder 34 serves together with the outer wall of the cylinder to provide an oil reservoir 70, which accommodates the difference in variation of volumes of chambers 50 and 54 as piston 37 is moved, which variation results from the presence of a part of rod 33 within chamber 17.

The tensioner of FIG. 2 eliminates jumping of the teeth of the belt over the teeth of the driving and driven wheels in the same manner as is described above with reference to the tensioner of FIG. 1.

Due to slight high speed forward and rearward movements of rod 33, a small amount of hydraulic fluid may leak outwardly past packing 41. At the same time air will enter the cylinder. These slight forward and rearward movements may occur as a result of variations in cam torque in the engine.

If air were allowed to enter chamber 50, some air would eventually find its way into chamber 54 making the fluid in chamber 54, as a whole, compressible. If this occurs, the variations in cam torque can result in increased movements of the piston of the tensioner resulting in vibration of the belt, reducing its useful life.

In the tensioner of FIG. 2, air entering the cylinder past packing 41, passes through hole 72 of gland 43, and is accumulated in a ring-like space 74. From space 74, the air passes upwardly through a small hole 76 and is guided to the hydraulic fluid reservoir 70.

Hydraulic fluid reservoir 70 is closed by, and located below, a diaphragm 78. Reservoir 70 is initially filled with hydraulic fluid. Reservoir 70 is located on top of the cylinder, and the cylinder is always mounted so that the reservoir remains on top of the cylinder. When the device is so mounted, any air which enters the cylinder past packing 41 passes to the reservoir and accumulates underneath diaphragm 78.

Even if air passes along the rod past packing 40, the air is guided to the reservoir 70 through small hole 80 which connects chamber 50 with reservoir 70.

In either case, air never reaches chamber 54, and the fluid in that chamber remains substantially incompressible, so that the vibration condition mentioned above is avoided.

Reservoir 30 replenishes hydraulic fluid which leaks past packing 41. The size of the reservoir is determined by the amount of air expected to enter, and the amount of oil expected to be lost from the unit during its lifetime. The volume of the reservoir will ordinarily need to be no more than several cubic centimeters. Diaphragm 78 of the reservoir is held in place by closure 82, which defines a space above the diaphragm preferably greater than the volume displacement of the diaphragm from its relaxed condition to its fully deformed condition. A hole 86 in closure 82 connects space 84 to the atmosphere so that the reservoir is always kept at atmospheric pressure.

Covering the reservoir with diaphragm 78 allows it to accommodate variations in volume caused by a flow of hydraulic fluid into and out of the reservoir, prevents the fluid from being leaked, and prevents entry of foreign material into the hydraulic fluid. It also permits the use of a reservoir of small size.

Figure 3:
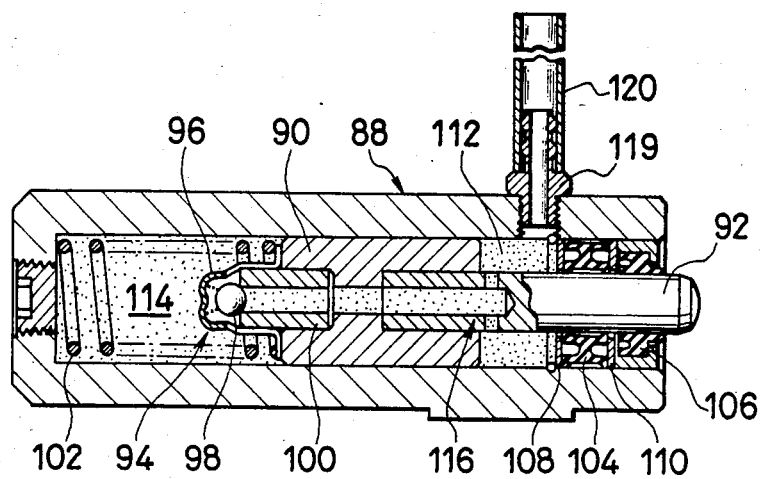
FIG. 3 is a longitudinal section through a cylinder unit adapted for use with a remote reservoir.
Figure 4:
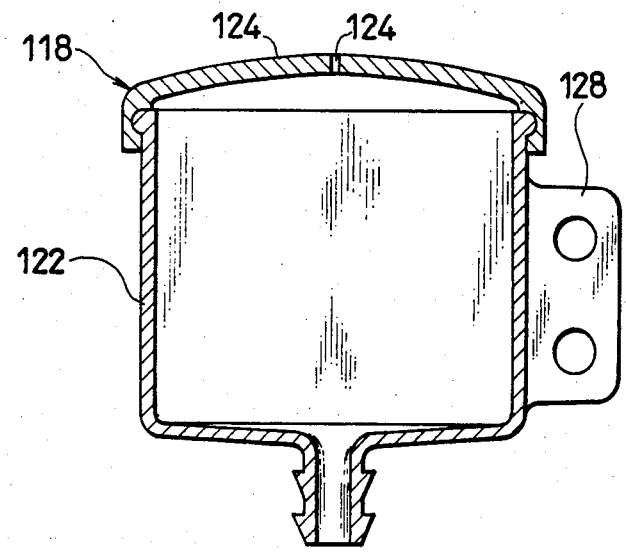
FIG. 4 is a sectional view of a hydraulic fluid reservoir for use with the cylinder unit of FIG. 3.

FIG. 3 shows another embodiment which is preferred where insufficient space is available for a cylinder having a built-in fluid reservoir, or where the diameter of the rod is large in relation to that of the cylinder so that a reservoir of large volume is required.

The assembly is similar to that of FIGS. 1 and 2 in that it comprises a cylinder 88, a piston 90, a rod 92, a piston carried check valve 94 comprising a retainer 96 and a ball 98 and a valve seat 100, a spring 102, packing 104, 106 and glands 108, 110. The piston separates the space within the cylinder into two chambers 112 and 114, which are connected by passage 116 in the piston rod when the check valve opens upon projecting movement of the rod 92. When the piston moves in the opposite direction, hydraulic fluid passes through the restricted space between the piston and the inner wall of the cylinder, allowing slow withdrawal of rod 92.

A nipple 119 is fitted to the wall of the cylinder at the top, and is in communication with chamber 112. The nipple is connected to a tank 118 (FIG. 3) through a tube 120.

Referring to FIG. 3, the tank 118 is composed of a main body 122 and a lid 124. The lid 124 is provided with a small hole 126 for maintaining the internal pressure at atmospheric. Reference number 128 indicates a mounting plate.

Where the reservoir is made separate from the cylinder and comprises a tank having a large volume, it is possible to supply hydraulic fluid to replenish leaked fluid for a long period of time and at the same time to use a cylinder as small as possible.

In the tensioners of FIGS. 1, 2 and 3, (and in the tensioners of FIGS. 6, 7 and 10 as well) when an inwardly directed force is applied to the projecting end of the piston rod, hydraulic fluid moves through the clearance between the piston rod and the inner wall of the cylinder allowing the piston and rod assembly to retract slowly. This retracting movement is referred to as a "leak-down", and the time required for retraction through a specified distance may be referred to as "leak-down time". A large clearance between the piston and the cylinder wall results in a low leak-down time. A smaller clearance results in a higher leak-down time. It is important to maintain the leak-down time within a proper range.

When a force urging the rod to retract is applied the rod should not retract excessively. For example, where the device is used to maintain tension in an engine cam timing belt, variations in cam torque result in variations in tension in the belt. These, in turn cause variations in the force applied to the tensioner rod, and vibrations may be set up in the belt as a result. These vibrations can be avoided by establishing a lower limit in the leak-down time of the tensioner.

The rod of the tensioner can easily and rapidly extend because of the check valve. Consequently, the rod of the tensioner tends to "pump up" or protrude farther and farther every time tension in the belt is relaxed. Relaxation can occur, for example, as a result of variations in torque. While the rod protrudes easily, it cannot retract as easily. Consequently, there is a tendency to apply progressively greater tensioning forces to the belt. The tension of the belt should not be allowed to become excessive. Excessive tension can be avoided by establishing an upper limit on the leak-down time in the tensioner. Leak-down times can be controlled to some extent by maintaining a small clearance between the piston and the cylinder wall. However, to provide a small clearance between the piston and the cylinder wall, it is necessary to manufacture the parts very accurately, which increases the cost of the unit.

Variations in viscosity of hydraulic fluid with temperature changes may lead directly to variations in leak-down time.

In the invention, these problems are addressed by making the piston from a material having a larger coefficient of linear expansion than that of the inner wall of the cylinder.

Preferably the leak-down time of the tensioner is kept constant even if the temperature of the surrounding atmosphere is varied. If the clearance between the piston and the cylinder is kept constant (that is, the coefficient of linear expansion of the material of the cylinder is the same as that of the piston), the leak-down time is varied by an amount corresponding to the variation in viscosity of the fluid.

Viscosity of a typical hydraulic fluid decreases as its temperature increases. Consequently the leak-down time is decreased. Therefore, if the piston clearance acts as an oil flow passage and the clearance is decreased as the temperature of oil increases, the reduction in oil viscosity and a reduction in clearance offset each other, and it is possible to prevent an excessive reduction of leak-down time. The offsetting action of course also occurs in the case of decreasing temperature.

Figure 5:
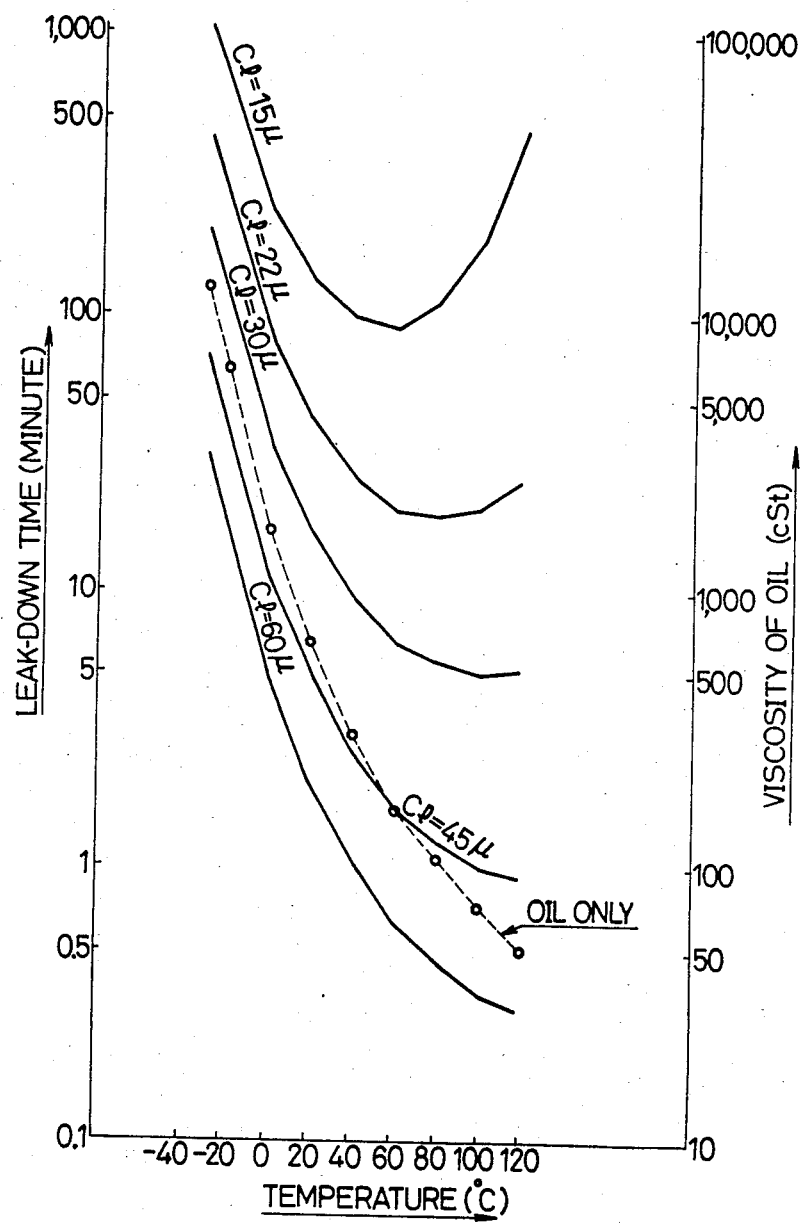
FIG. 5 is a graph showing the variation in viscosity of a typical hydraulic fluid, and also showing variations in cylinder leak-down times for several different piston-cylinder clearances.

FIG. 5 illustrates the above-mentioned relation. A line designated "oil only" in the figure shows a variation in viscosity of hydraulic fluid (oil) with temperature. If a piston clearance is not varied in response to temperature, the leak-down time varies in parallel with the line showing a variation in oil viscosity. (The line showing this relation is not illustrated in the figure.) However, if the piston clearance is varied in response to temperature, it is possible to reduce the variation in leak-down time.

To produce the leak-down characteristics shown in FIG. 5 the spring 58 of the tension device shown in FIG. 2 is removed, a load of 12.6 Kg. is applied to the extreme end of the rod 33 and a time required for the rod to move rearwardly from its initial position by 5 mm. is shown for every temperature. The values of Cl.=15, 22, 30, 45 and 60 represent clearances between the piston and the cylinder at a temperature of 20° C. (A value of 15 corresponds to a clearance 0.015 mm.) In the preferred embodiment, the cylinder material is cast iron and the piston material is a bronze having a larger coefficient of linear expansion than that of the cast iron.

At 20° C. clearances from 0.045 to 0.015 mm., clearly the variation in leak-down time are significantly reduced.

In case of a clearance of 0.015 mm., it is apparent that a rate of reduction in clearance is higher than the variation in viscosity of oil caused by an increased temperature, and the leak-down time increases with increasing temperatures above approximately 60° C.

With reference to FIG. 2, it is apparent that the greater the clearance, the less the offsetting action.

In the embodiments depicted in FIGS. 1-3 when the piston rod is advanced, it is not easily returned to its original position. It is necessary to apply a large force, typically 20 Kg., for at least several, and up to ten or more, minutes to return the rod to its retracted condition. When the timing belt is removed and then reinstalled or replaced, the problem of pushing the tensioner rod in may occur. The same problem can also occur when the tension device is delivered to a user with the rod in the advanced condition. It is not possible for the user to assemble the tensioner. Consequently, the rod must be fixed in its retracted position with some form of stop before delivery to the user.

Figure 6:
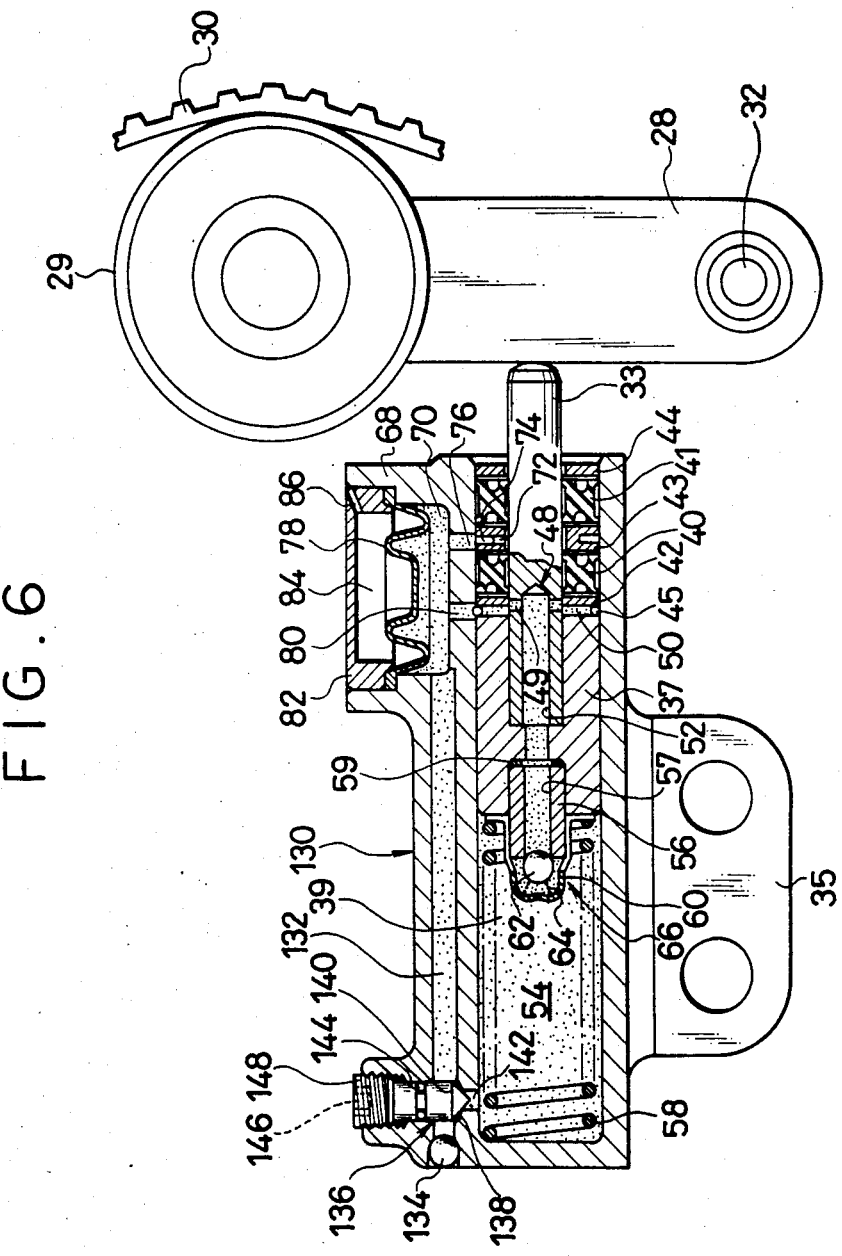
FIG. 6 shows a further embodiment of the invention comprising a cylinder unit having a valved bypass passage in the cylinder wall, an arm, and a roller in contact with a toothed belt, the cylinder unit being shown in longitudinal section.

In the embodiment shown in FIG. 6, the above-mentioned problems have been solved by providing a hydraulic fluid bypass passage connecting the chamber on one side of the piston with the chamber on the opposite side of the piston. This passage is normally closed by a valve, and when it is desired to push the rod into the unit, the valve is opened, so that hydraulic fluid can flow easily through the passage.

Except for the bypass passage, the tensioner FIG. 6 is structurally and functionally very similar to the tensioner of FIG. 2. Corresponding parts are given the same reference numbers.

The upper wall of body 130 of the cylinder is made larger to accommodate a longitudinal passage 132, which extends from reservoir 70 to a valve near the left-hand end of the cylinder. The passage is closed, after it is formed, by a ball 134. A threaded valve plug 136 has a conical valve surface 138 cooperating with a seat 140 in a transverse passage 142 leading from chamber 54 to passage 132. An O-ring 144 is provided to prevent leakage of hydraulic fluid, and a hexagonal hole 146 is provided in head 148 of the plug for a wrench used to open and close the valve.

Since passage 132 is normally closed by the valve, the device functions in a manner identical to that of the tensioner in FIG. 2. Passage 132 is opened to chamber 54 by loosening plug 136 to provide a slight clearance between surface 138 and seat 140. Opening of passage 132 and pushing rod 33 into the unit causes hydraulic fluid to move into chamber 50 through passage 132 and reservoir 70, instead of through the small clearance between the piston and the cylinder. Consequently, it is possible to push the rod into the unit easily and rapidly. When the rod is fully retracted, the arm and roller assembly can easily be moved to allow removal and replacement of the toothed belt. The the new belt is in place, the valve closed, and spring 58 is allowed to push rod 33 outwardly against arm 28 until the proper balance is achieved between the force of spring 58 and the tension in belt 30.

Another way to overcome the difficulty of pushing the rod into the cylinder unit when installing the unit or replacing a belt is to provide for free flow of hydraulic fluid from the chamber on one side of the piston to the chamber on the other side through a passage which is opened when the piston is rotated.

In accordance with the invention, a passage may be provided in the wall of the cylinder connected, preferably through a reservoir, to a chamber on one side of the piston. This passage opens at the internal wall of the cylinder, but is closed off by the piston in normal operation. The piston, however, has a recess in its outer surface which can be brought into registration with the opening of the passage by rotation of the piston. The recess permits free flow of hydraulic fluid from one chamber into the other, and thereby allows rapid retraction of the piston rod.

Figure 7:
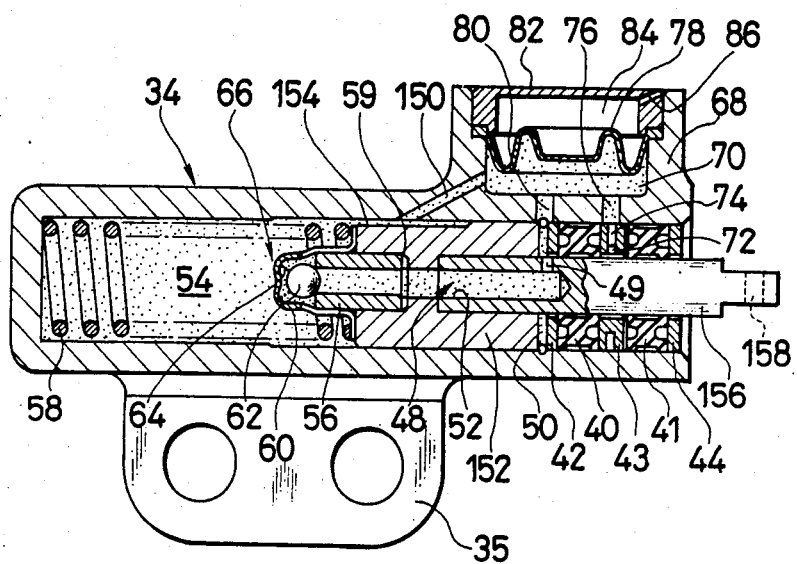
FIG. 7 is a longitudinal section through a cylinder unit in accordance with the invention, having a fluid bypass passage cooperating with a recess in the piston.
Figure 8:
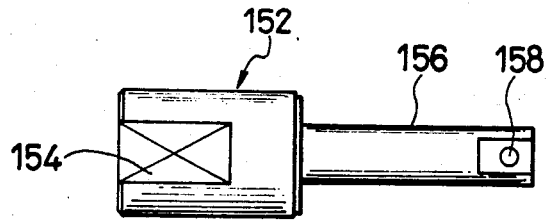
FIG. 8 is a top plan view of the piston of FIG. 7.
Figure 9:
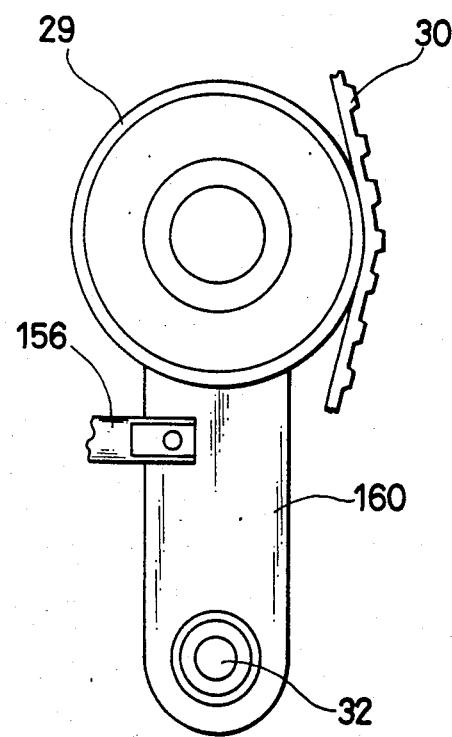
FIG. 9 is a fragmentary view of an arm and roller assembly, showing how the rod of the piston of FIGS. 7 and 8 is connected to the arm to prevent rotation of the rod and piston, thereby keeping the recess of the piston out of registration with the fluid bypass passage.

The tensioner having a piston with a recess is shown in FIGS. 7, 8 and 9. Except for the bypass passage, the rod structure and the recess in the piston, the structure and function of the tensioner are similar to the structure and function of the tensioner in FIG. 2. Corresponding parts are given the same reference numbers.

As shown in FIG. 7, the wall of the cylinder has an oblique passage 150 leading from reservoir 70 to an opening in the interior wall of the cylinder. The piston 152 has a recess 154 extending from its left end to an intermediate location on the outer surface of the piston. The recess, also shown in FIG. 8, is in communication with chamber 54. Its length is such that it can remain in registry with the opening of oblique passage 150 until the piston is retracted as far as it needs to be retracted. However, a portion of the piston to the right of the recess provides the small clearance necessary to allow only slow flow of hydraulic fluid from chamber 54 to chamber 50 during retraction of the rod in normal operation. The circumferential width of the recess is such that, upon rotation of piston 152 through ninety degrees, it is moved out of registration with the opening of passage 150.

Rod 156 is fixed to piston 152 so that the rod and piston rotate together and so that, when the rod is held against rotation, the piston cannot rotate. At the end of the rod remote from the piston, the rod is provided with a flattened portion having a transverse hole 158. Hole 158 is positioned in relation to the recess so that, at one position when recess 154 is out of registration with passage 150, the axis of hole is horizontal. This allows the rod to be connected to pivoted arm 160 by a pin as shown in FIG. 9. The connection of rod 156 to arm 160 in this manner prevents the piston from rotating and holds recess 154 out of registration with the opening of oblique passage 150 in normal operation of the tensioner.

When it is necessary to replace a toothed belt, the belt can be cut, the pin connecting rod 156 to arm 160 can be removed, and the rod rotated ninety degrees to bring recess 154 into registration with the opening of oblique passage 150. The rod can then be easily pushed to its retracted condition, returned to its extended condition after the belt is replaced, and reconnected to arm 160.

Figure 10:
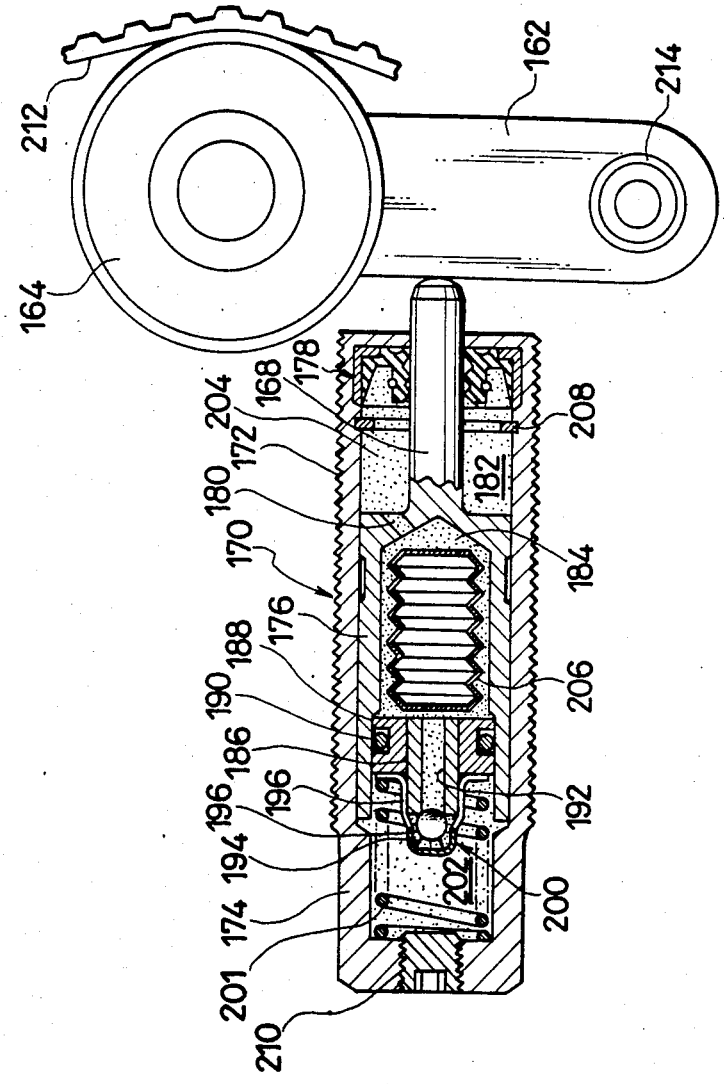
FIG. 10 shows a further embodiment of the invention comprising a cylinder unit, shown in longitudinal section, comprising a piston having an internal passage containing a sealed air accumulator, a pivoted arm and a roller in contact with a toothed belt.

As mentioned previously, one problem with hydraulic fluid containing tensioners is that air may enter the chamber behind the piston along with the hydraulic fluid which flows into that chamber. If air accumulates in that chamber, its compressibility can allow variations in belt tension, such as may result from variations in cam torque, to set up vibrations in the belt and in the tensioner. Air can accumulate, for example, as a result of leakage of air from the foam elements of FIG. 1 after extended use. To prevent this accumulation of air, the differences in variation of volumes of chambers on both sides of the piston, caused by the presence of the rod, can be accommodated by deformation of an air-filled accumulator as shown in FIG. 10. The air-filled accumulator of FIG. 10 does not permit any leakage of air during its use, and therefore there is no deterioration in operation of the tensioner as a result of leakage of air.

In FIG. 10, an arm 162 for supporting a roller 164 in contact with a return run of a toothed belt 166 is pivoted at 4 and the arm is pushed in the direction to hold the belt in tension by rod 168 extending out of cylinder 170.

Cylinder 170 has a front large diameter part 172 and a rear small diameter part 174. A piston 176 is slidable axially in the cylinder, there being a small clearance between the piston and the internal wall of the cylinder. The piston and rod are formed as a unit. To prevent leakage of hydraulic fluid filling the cylinder an oil seal 178, which also acts as a dust seal, is provided at the right-hand end of the cylinder.

The piston 176 is provided with a hole 180 opening chamber 182 in front of the piston to a hollow chamber 184 inside the piston. A ball seat 186 is fixed to a plug 188 which is fixed to piston 176 and sealed by O-ring 190. A longitudinal passage 192 opens to the hollow chamber 184 inside the piston to the rear chamber 194. A weak spring 194 is arranged between a retainer 196 carried by the piston and ball 198, urging the ball against the opening at the end of seat 186 to form a check valve 200. A compression spring 201, located in chamber 202 on the left side of the piston, holds the retainer against plug 188, and urges the piston to the right, i.e. in the direction to extend rod 168. Check valve 200 allows hydraulic fluid 204 to flow freely from chamber 182 to chamber 202 through chamber 184 and passage 192, as the piston moves to the right. However, it closes as the piston moves to the left, requiring hydraulic fluid to flow through the restricted clearance between the piston and the wall of the cylinder.

A bellows-type accumulator 206 accommodates differences in the variation in volumes of chambers 182 and 202 during movement of piston 176.

Reference numeral 208 designates a ring which acts as a stop limiting forward movement of piston 176. Reference numeral 210 designates a plug closing the rear of the cylinder.

The tensioner of FIG. 10 holds belt 212 in tension by exerting a force through rod 168 urging arm 162 in the clockwise direction about pivot 214. It allows roller to move rapidly to take up slack in the belt, but, when tension in the belt increases suddenly, the tensioner rod retracts slowly so that the tension in the belt returns gradually to the desired value. In these respects, the tensioner is similar to those shown in FIGS. 1-9, and effectively prevents the teeth of the belt from jumping the teeth of the driven or driving wheels.

Compensation for differences in the changes of volume in chambers 182 and 202 is accomplished by air-filled accumulator 206. The accumulator is sealed and cannot release air into the hydraulic fluid. The accumulator prevents internal pressure in chamber 182 from causing leakages of fluid out of the cylinder past seal 178. It likewise prevents external atmospheric pressure from forcing air into chamber 182 past seal 178 as chamber 182 expands. The use of the air-filled accumulator consequently extends the useful life of the tensioner.

Preferably, the shape of the accumulator is in the form of a bellows, so that the direction of deformation is restricted. However, the shape of the accumulator, as well as that of the piston rod and other parts of the tensioner can be varied.

Features of the several embodiments described above can be combined. For example, in any of the embodiments, the materials of the cylinder wall and piston can be chosen to produce reduced variations in leak-down times. The fluid bypassing schemes for allowing rapid rod withdrawal, as shown in FIGS. 6 and 7, can be incorporated into any of the other embodiments. Various other modifications can be made to the tensioners specifically described without departing from the scope of the invention as defined in the following claims.

We claim:

1. A tensioner for a toothed belt comprising means providing a cylindrical interior wall, a piston slidable within, and substantially conforming to, the cylindrical wall, a rod connected to the piston and extending, substantially along the axis of the interior wall, from the piston to the exterior of the interior wall providing means, packing means surrounding the rod and, with the cylindrical wall and piston, forming a substantially enclosed first chamber on one side of the piston, means cooperating with the interior wall providing means and the piston forming a substantially enclosed second chamber on the opposite side of the piston, hydraulic fluid substantially filling both chambers, a first fluid passage having one-way check valve means allowing flow of hydraulic fluid from one of the chambers to the other as the piston moves in a direction to decrease the volume of said one of the chambers, spring means urging the piston in said direction, means providing a second fluid passage allowing relatively restricted flow of hydraulic fluid from said other chamber to said one of said chambers as the piston moves in the opposite direction;

in which the second fluid passage allowing relatively restricted flow of hydraulic fluid from said other chamber to said one of said chambers is provided by a clearance between the piston and the cylindrical interior wall;

in which the check valve is carried by the piston; and in which the first fluid passage comprises a first part extending axially through the piston and a second part, communicating with the first part, said second part extending transversly through the rod.

2. A tensioner according to claim 1 having a compressible, sealed, air-filled accumulator in contact with the hydraulic fluid in the first chamber, the compression of the accumulator allowing the volumetric expansion of the hydraulic fluid space in the first chamber to equal the volumetric contraction of the hydraulic fluid space in the second chamber as said piston moves in the direction to decrease the volume of the second chamber.

3. A tensioner according to claim 2 in which the piston has a hollow interior space, the accumulator is contained in said hollow interior space, and in which the hollow interior space is in fluid communication with the first chamber through an opening in the piston.

4. A tensioner according to claim 3 in which the check valve is carried by the piston and in which the first fluid passage extends through the piston and includes said hollow interior space and said opening in the piston.

5. A tensioner according to claim 1 in which the spring means is a compressed coil spring located in the second chamber, the spring bearing against the piston, and urging the piston in a direction to decrease the volume of the first chamber.

6. A tensioner according to claim 1 having a compressible, closed-cell foamed elastomer within the first chamber, compression of which allows the volumetric expansion of the hydraulic fluid space in the first chamber to equal the volumetric contraction of the hydraulic fluid space in the second chamber as the piston moves in the direction to decrease the volume of the second chamber.

7. A tensioner according to claim 1 having a compressible closed-cell foamed elastomer located within the first chamber and surrounding the rod, the foamed elastomer closing the space between the rod and the cylindrical inner wall and serving in part as a seal to aid in preventing leakage of hydraulic fluid out of the first chamber, and serving in part as a compressible medium which allows the volumetric expansion of the hydraulic fluid space in the first chamber to equal the volumetric contraction of the hydraulic fluid space in the second chamber as said piston moves in the direction to decrease the volume of the second chambers.

8. A tensioner according to claim 1 comprising an arm, means providing a pivot allowing said arm to swing about a pivot axis, and a roller rotatably mounted on said arm on an axis parallel to and spaced from said pivot axis, said roller being adapted to engage one side of a toothed belt, said rod having an end, remote from the piston, engaged with the arm and positioned in relation to the arm so that, as the rod extends, it causes the arm to swing about said pivot.

9. A tensioner according to claim 1 having a hydraulic fluid reservoir in communication with the first chamber.

10. A tensioner according to claim 1 having a hydraulic fluid reservoir in communication with the first chamber, the means providing a cylindrical interior wall having an exterior wall, and a part of the exterior wall constituting a part of the boundary of the reservoir.

11. A tensioner for a toothed belt comprising means providing a cylindrical interior wall, a piston slidable within, and substantially conforming to, the cylindrical wall, a rod connected to the piston and extending, substantially along the axis of the interior wall, from the piston to the exterior of the interior wall providing means, packing means surrounding the rod and, with the cylindrical wall and piston, forming a substantially enclosed first chamber on one side of the piston, means cooperating with the interior wall providing means and the piston forming a substantially enclosed second chamber on the opposite side of the piston, hydraulic fluid substantially filling both chambers, a first fluid passage having one-way check valve means allowing flow of hydraulic fluid from one of the chambers to the other as the piston moves in a direction to decrease the volume of said one of the chambers, spring means urging the piston in said direction, means providing a second fluid passage allowing relatively restricted flow of hydraulic fluid from said other chamber to said one of said chambers as the piston moves in the opposite direction, said tensioner having a hydraulic fluid reservoir, the means providing a cylindrical interior wall having an exterior wall, a part of the exterior wall constituting a part of the boundary of the reservoir, and having a third fluid passage through said part of the wall providing fluid communication between said reservoir and said first chamber, said packing means comprising first and second packing elements axially spaced from each other, and a fourth fluid passage extending through said part of the wall from the space between the packing element to the reservoir, the reservoir being located above the rod, and the fourth fluid passage extending upwardly from the space between the packing elements to the reservoir whereby air drawn in along the surface of the rod toward the first chamber is carried upwardly into the reservoir and thereby prevented from entering the first chamber.

12. A tensioner according to claim 1 having a hydraulic fluid reservoir separate from the cylindrical wall providing means and connected to the first chamber through an elongated conduit.

13. A tensioner according to claim 1 in which the second fluid passage allowing relatively restricted flow of hydraulic fluid from said other chamber to said one of said chambers is provided by a clearance between the piston and the cylindrical interior wall, in which the piston has a higher coefficient of linear expansion than that of the interior wall providing means.

14. A tensioner according to claim 1 in which the second fluid passage allowing relatively restricted flow of hydraulic fluid from said other chamber to said one of said chambers is provided by a clearance between the piston and the cylindrical interior wall, in which the piston has a higher coefficient of linear expansion than that of the interior wall providing means, and in which the clearance between the piston and the interior wall is within the range of approximately 0.015 to 0.060 mm. at a temperature of 20° C.

15. A tensioner according to claim 1 in which the second fluid passage allowing relatively restricted flow of hydraulic fluid from said other chamber to said one of said chambers is provided by a clearance between the piston and the cylindrical interior wall, in which the piston has a higher coefficient of linear expansion than that of the interior wall providing means, and in which the interior wall providing means is cast iron, and the piston is bronze.

16. A tensioner according to claim 1 in which the second fluid passage allowing relatively restricted flow of hydraulic fluid from said other chamber to said one of said chambers is provided by a clearance between the piston and the cylindrical interior wall, in which the piston has a higher coefficient of linear expansion than that of the interior wall providing means, and in which the interior wall providing means is cast iron, and the piston is bronze, and in which the clearance between the piston and the interior wall is within the range of approximately 0.015 to 0.060 mm. at a temperature of 20° C.

17. A tensioner according to claim 1 having a third fluid passage connecting the first and second chambers, the third passage having closable valve means for selectably closing off flow of hydraulic fluid through the third passage, and said third passage and closable valve means allowing relatively unrestricted fluid communication between said chambers when the closable valve means is opened.

18. A tensioner according to claim 17 in which the third fluid passage is formed in the means providing a cylindrical interior wall.

19. A tensioner according to claim 17 having a hydraulic fluid reservoir in communication with the first chamber, and in which the third fluid passage is connected to the second chamber directly, and indirectly to the first chamber through the hydraulic fluid reservoir.

20. A tensioner according to claim 1 including a third hydraulic fluid passage means connected to the first chamber and terminating at an opening in said interior wall, the length of the piston and the position of said opening being such that said opening is normally closed by the piston throughout the range of axial movement of the piston, and the piston having a recess in its outer surface normally spaced circumferentially from said opening but movable into registration with the opening by rotation of the piston, said recess permitting relatively unrestricted flow of hydraulic fluid from the second chamber to the opening, and from the opening through the third passage means to the first chamber, whereby the piston can be rapidly moved axially during installation or replacement of the tensioner.

21. A tensioner according to claim 20 in which the rod is fixed against rotation relative to the piston, and includes connection means, at its end remote from the piston, for connection to the arm of a tension roller assembly, said connection means, when connected to an arm, preventing rotation of the rod and piston.

* * * * *

REEXAMINATION CERTIFICATE (1293rd)
United States Patent [19]
Kimura et al.

[11] B1 4,708,696
[45] Certificate Issued  May 29, 1990

[54] TENSIONER FOR TOOTHED DRIVE BELTS

[75] Inventors: Kazuo Kimura, Tokorozawa; Masao Maruyama, Hanno, both of Japan

[73] Assignee: Tsubakimoto Chain Co., Osaka, Japan

Reexamination Request:
No. 90/001,874, Oct. 30, 1989

Reexamination Certificate for:
Patent No.: 4,708,696
Issued: Nov. 24, 1987
Appl. No.: 872,928
Filed: Jun. 11, 1986

[30] Foreign Application Priority Data

| Aug. 30, 1985 | [JP] | Japan | 60-131595 |
| Aug. 30, 1985 | [JP] | Japan | 60-131591 |
| Aug. 30, 1985 | [JP] | Japan | 60-131592 |
| Aug. 30, 1985 | [JP] | Japan | 60-131593 |
| Aug. 30, 1985 | [JP] | Japan | 60-131594 |

[51] Int. Cl.⁵ ............................................. F16H 7/12
[52] U.S. Cl. ................................. 474/103; 474/138
[58] Field of Search ......................... 474/101-103, 474/109-111, 136, 138, 133, 135; 305/10; 267/34

[56] References Cited
U.S. PATENT DOCUMENTS 3,794,309  2/1974  Chrokey et al. ............... 267/34
4,190,025  2/1980  Wahl ............................. 474/110 X

*Primary Examiner*—Thuy M. Bui

[57] ABSTRACT

A tensioner for toothed belts comprises a hydraulic fluid filled cylinder having a piston with a rod projecting out of the cylinder and engaging a pivoted arm with a roller at one end for engaging the belt. A spring within the cylinder urges the rod in the projecting direction, and a check valve carried by the piston allows the rod to project rapidly to take up slack in the belt. Hydraulic fluid, however, flows through the small clearance between the piston and the cylinder wall as the rod retracts, and therefore limits the rate of retraction. A path is provided between seals surrounding the rod to route air directly to the reservoir so that it does not enter the fluid chambers within the cylinder. The piston material is chosen to expand more rapidly than the cylinder with increasing temperatures to reduce variations in leakdown time.

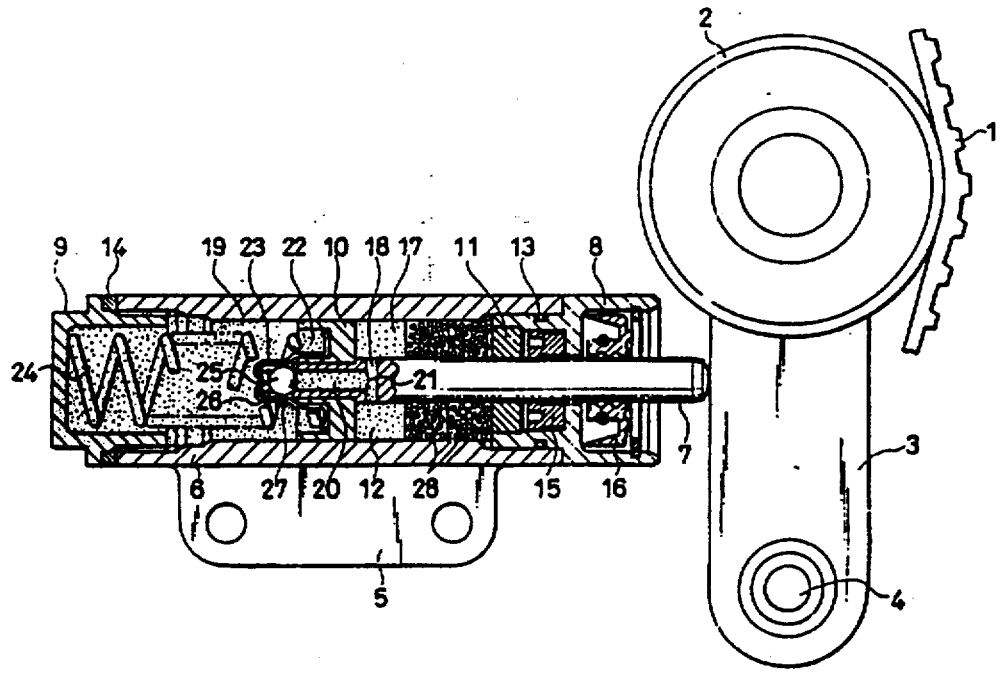

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 11 are determined to be patentable as amended.

Claims 2–10 and 12–21, dependent on an amended claim, are determined to be patentable.

New claims 22–25 are added and determined to be patentable.

1. A tensioner for a toothed belt comprising means providing a cylindrical interior wall, a piston slidable within, and substantially conforming to, the cylindrical wall, a rod connected to the piston and extending, substantially along the axis of the interior wall, from the piston to the exterior of the interior wall providing means, packing means surrounding the rod and, with the cylindrical wall and piston, forming a substantially enclosed first chamber on one side of the piston, means cooperating with the interior wall providing means and the piston forming a substantially enclosed second chamber on the opposite side of the piston, hydraulic fluid substantially filling both chambers, a first fluid passage having one-way check valve means allowing flow of hydraulic fluid from [one of the chambers] *said first chamber* to [the other] *said second chamber* as the piston moves in a direction to decrease the volume of said [one of the chambers] *first chamber*, spring means urging the piston in said direction, means providing a second fluid passage allowing relatively restricted flow of hydraulic fluid from said [other] *second* chamber to said [one of said chambers] *first chamber* as the piston moves in the opposite direction;
in which the second fluid passage [allowing relatively restricted flow of hydraulic fluid from said other chamber to said one of said chambers] is provided by a clearance between the piston and the cylindrical interior wall;
[in which the check valve is carried by the piston; and]
in which the first fluid passage comprises a first part extending axially through the piston and a second part, communicating with the first part, said second part extending [transversly] *transversely* through the rod; *and*
*in which the check valve is carried by the piston and comprises a valve element, a valve seat, and means continuously urging the valve element toward engagement with the valve seat so that the check valve is always immediately closed when the piston stops moving in said direction to decrease the volume of said first chamber, whereby, whenever the piston begins to move in said opposite direction, the check valve is either already closed or is immediately closed, and substantially all of the flow of fluid from the second chamber toward the first chamber, during movement of the piston in said opposite direction, takes place through said second fluid passage.*

11. A tensioner for a toothed belt comprising means providing a cylindrical interior wall, a piston slidable within, and substantially conforming to, the cylindrical wall, a rod connected to the piston and extending, substantially along the axis of the interior wall, from the piston to the exterior of the interior wall providing means, packing means surrounding the rod and, with the cylindrical wall and piston, forming a substantially enclosed first chamber on one side of the piston, means cooperating with the interior wall providing means and the piston forming a substantially enclosed second chamber on the opposite side of the piston, hydraulic fluid substantially filling both chambers, a first fluid passage having one-way check valve means allowing flow of hydraulic fluid from one of the chambers to the other as the piston moves in a direction to decrease the volume of said one of the chambers, spring means urging the piston in said direction, means providing a second fluid passage allowing relatively restricted flow of hydraulic fluid from said other chamber to said one of said chambers as the piston moves in the opposite direction, said tensioner having a hydraulic fluid reservoir, the means providing a cylindrical interior wall having an exterior wall, a part of the exterior wall constituting a part of the boundary of the reservoir, and having a third fluid passage through said part of the wall providing fluid communication between said reservoir and said first chamber, said packing means comprising first and second packing elements axially spaced from each other, and a fourth fluid passage extending through said part of the wall from the space between the packing [element] *elements* to the reservoir, the reservoir being located above the rod, and the fourth fluid passage extending upwardly from the space between the packing elements to the reservoir whereby air drawn in along the surface of the rod toward the first chamber is carried upwardly into the reservoir and thereby prevented from entering the first chamber.

*22. A tensioner according to claim 1 in which the means continuously urging the valve element toward engagement with the valve seat is a spring.*

*23. A tensioner according to claim 11 in which said fourth fluid passage extends continuously in the upward direction from the space between the packing elements to the reservoir.*

*24. A tensioner according to claim 11 in which said fourth fluid passage extends directly from the space between the packing elements to the reservoir, bypassing said first chamber.*

*25. A tensioner according to claim 11 in which said fourth fluid passage extends continuously in the upward direction, directly from the space between the packing elements to the reservoir, bypassing said first chamber.*

* * * * *